United States Patent [19]
Farrell et al.

[11] Patent Number: 5,552,002
[45] Date of Patent: Sep. 3, 1996

[54] METHOD FOR MAKING PAPERBOARD PACKAGING CONTAINING A PVOH BARRIER

[75] Inventors: Robert A. Farrell, Silver Spring; Christopher J. Parks, Ellicott City, both of Md.

[73] Assignee: Westvaco Corporation, New York, N.Y.

[21] Appl. No.: 328,118

[22] Filed: Oct. 24, 1994

Related U.S. Application Data

[62] Division of Ser. No. 159,528, Dec. 1, 1993, Pat. No. 5,506,011.

[51] Int. Cl.⁶ ................................................. B32B 31/12
[52] U.S. Cl. .................. 156/82; 156/497; 156/244.11; 156/244.23; 428/35.4; 428/36.6; 428/34.2
[58] Field of Search .................... 156/497, 82, 244.23, 156/244.11, 272.6; 428/35.4, 36.6, 34.2, 511, 515

[56] References Cited

U.S. PATENT DOCUMENTS

| | | | |
|---|---|---|---|
| 3,640,788 | 2/1972 | Flynn | 156/82 |
| 3,870,461 | 3/1975 | Wise | 156/497 X |
| 4,239,826 | 12/1980 | Knott et al. | 428/35 |
| 4,254,169 | 3/1981 | Schroeder | 428/35 |
| 4,407,897 | 10/1983 | Farrell et al. | 428/516 |
| 4,425,410 | 1/1984 | Farrell et al. | 428/516 |
| 4,564,443 | 8/1984 | Farrell et al. | 428/688 |
| 4,701,360 | 10/1987 | Gibbons et al. . | |
| 4,802,943 | 2/1989 | Gibbons et al. | 156/82 X |
| 4,861,526 | 8/1989 | Gibbons et al. | 156/244.17 X |
| 4,957,578 | 9/1990 | Huffman et al. | 156/244.23 X |
| 5,059,459 | 10/1991 | Huffman . | |
| 5,116,649 | 5/1992 | Massouda | 156/82 X |
| 5,213,858 | 5/1993 | Tanner et al. . | |
| 5,225,256 | 7/1993 | Marano et al. . | |
| 5,330,845 | 7/1994 | Andersson et al. . | |

FOREIGN PATENT DOCUMENTS

| | | | |
|---|---|---|---|
| 781436 | 3/1968 | Canada | 156/82 |
| 9006222 | 6/1990 | WIPO | 156/244.11 |

OTHER PUBLICATIONS

"High Barrier Polymers", by A. L. Blackwell, 1986 Coextrusion Seminar, Marriott Hilton Head, Hilton Head, SC, published by Tappi Press, pp. 13–18.

Primary Examiner—David A. Simmons
Assistant Examiner—Steven J. Helmer

[57] ABSTRACT

Paperboard packaging for non-refrigerated liquid products and for dry products contains a buried polyvinyl alcohol copolymer (PVOH) barrier layer which has a low oxygen permeability particularly at low relative humidity, and outer heat-sealable surfaces which provide good resistance to moisture penetration and a means for fabricating the packaging.

4 Claims, 6 Drawing Sheets

METHOD FOR MAKING PAPERBOARD PACKAGING CONTAINING A PVOH BARRIER

This is a divisional, of application Ser. No. 08/159,528 filed Dec. 1, 1993, now U.S. Pat. No. 5,506,011.

BACKGROUND OF INVENTION

The present invention relates in general to packaging prepared from a paperboard laminate. More particularly, the present invention relates to a heat-sealable paperboard laminate, and packages constructed from that laminate, which includes a buried polyvinyl alcohol copolymer (PVOH) barrier material.

Barrier materials are used in paperboard packaging to accomplish several results. First, barrier materials are required to prevent the egress from the package of flavors, aromas and other ingredients of the packaged product. Secondly, barrier materials are also required to prevent the ingress into the package of oxygen, moisture and other contaminants that might degrade the packaged product.

Many attempts have heretofore been made to provide barrier properties to paperboard packaging. For example, low density polyethylene (LDPE) is a well known component of prior art paperboard packaging since it provides good moisture resistance, and, because it is heat sealable, it provides a means for fabricating the packages. Likewise, the presence of a metallic foil as an inner barrier also significantly reduces the transmission of flavors and aromas out of the package and the transmission of oxygen into the package. However, laminates including metallic foil are difficult to recycle and the use of foil significantly increases the cost of the resulting package. Other attempts at providing barrier protection in paperboard packaging have involved the use of polymeric barrier materials such as ethylene vinyl alcohol copolymers (EVOH); polyvinylidene chloride and its copolymers (PVDC); polyacrylonitrile and its copolymers (PAN); polyamides (PA); polyethylene terephthalate (PET); polyvinyl chloride (PVC); and polypropylene (PP). Of these materials, EVOH is the preferred barrier material (see article entitled, "HIGH BARRIER POLYMERS", by A. L. Blackwell, 1986 Coextrusion Seminar, Marriott Hilton Head, Hilton Head, S.C., published by TAPPI Press). In addition polyvinyl alcohol (PVOH) has been suggested in the past as a potential barrier material (see U.S. Pat. Nos. 4,239,826; 4,254,169; 4,407,897; 4,425,410; and 4,464,443). However, the patented uses for PVOH as a barrier material are for film-only packaging. This is partly due to the fact that PVOH is highly sensitive to moisture, but its absence from paperboard packaging is believed to be primarily due to the fact that it is difficult to process.

The barrier properties and particularly the oxygen permeability rate of most polymers is dependent to some degree on the relative humidity to which they are exposed. For example, the oxygen permeability of both EVOH and PVOH is lower under dry conditions than under humid conditions, while the oxygen permeability of amorphous nylon (SELAR PA), is lower under humid conditions than under dry conditions. Because of this sensitivity to moisture, most laminates used for packaging which incorporate a barrier, are usually multi-layered, with the barrier material surrounded by layers designed to keep it isolated from both atmospheric humidity and the moist contents of the packaged products. In the case of refrigerated liquid products stored in paperboard containers, both the inside and outside of the container may be at or near 100% RH. If it is assumed that the entire structure is at equilibrium, it may be concluded that the barrier layer, even though sandwiched between other layers, is also at 100% RH. However, for packaging dry products, and non-refrigerated liquid products, where the moisture conditions are less extreme, the moisture sensitivity of the barrier material may not be of overwhelming concern. Thus, the relatively low oxygen permeability of PVOH, particularly at low RH, makes it an attractive candidate for use as a barrier material in paperboard laminates, particularly for packaging non-refrigerated liquid products and for dry products, despite its processing difficulties.

SUMMARY OF INVENTION

It is an object of the present invention to provide an improved heat-sealable, non-foil paperboard laminate with PVOH as a barrier material, for use in making packaging. In particular, the present invention is useful for packaging dry products, or liquid products that do not require refrigeration.

In one embodiment of the present invention, a PVOH barrier material is applied directly to paperboard. In another embodiment of the invention, the PVOH barrier material may be applied to the paperboard in the form of a coextruded sandwich.

Using VINEX polyvinyl alcohol copolymer resins from Air Products and Chemicals, a layer of PVOH was successfully applied directly to paperboard in the form of an extrusion coating. A good bond was achieved by first applying water to the paperboard surface to pre-treat the surface before extrusion coating. By practicing this method, the PVOH becomes partially dissolved, allowing it to penetrate slightly into the surface of the paperboard, resulting in a strong fiber-tearing bond. This method may be practiced by any suitable coating technique including coextrusion, extrusion coating, or by laminating an already prepared film of PVOH to the wetted surface of the paperboard. Laminates prepared according to this method demonstrated low oxygen permeability particularly under conditions of low relative humidity. At room temperature and under dry conditions (20% RH), the oxygen permeability of a 0.5 mil thick layer of PVOH extrusion coated on paperboard is less than 0.01 cc mil/100 in$^2$ day ATM, making PVOH a better oxygen barrier than either EVOH or nylon (SELAR PA) under these conditions.

In another embodiment of the present invention, the PVOH barrier material was applied to the paperboard as a coextruded sandwich including low density polyethylene (LDPE), a good moisture barrier which is also heat sealable, and tie layers. This method requires the use of coextrudable layers which have melt temperatures close to the melt temperature of PVOH. Whereas LDPE and the tie layers generally useful with LDPE typically are extruded at temperatures greater than 500° F., PVOH begins to degrade at about 430° F. Therefore, the grades of LDPE useful with PVOH must have a melt temperature of around 400° F. and the tie layers must likewise have melt temperatures lower than conventional tie layers. Coextrusion techniques may also be used to make the products of the first embodiment where the PVOH is in direct contact with the paperboard. For example, a sandwich layer of PVOH/tie layer/LDPE, may be coextruded directly onto a treated paperboard surface, or a sandwich layer comprising tie layer/LDPE may be coextruded onto a PVOH layer which was previously applied to the paperboard. Those skilled in the art will readily foresee other possible combinations within the scope of the present invention.

Accordingly, the present invention may be seen to comprise a substantially oxygen impermeable, leak-free, paperboard laminate incorporating PVOH as its barrier material, container blanks formed from the laminate and containers formed from the blanks. A preferred embodiment of the laminate structure comprises inner and outer layers of a heat sealable polymer such as LDPE, paperboard such as milk carton stock, one or more interior layers of PVOH and appropriate tie layers. The PVOH layer is preferably a VINEX polyvinyl alcohol copolymer resin from Air Products and Chemicals Company, but other PVOH resins could be substituted. The VINEX resins are extrudable grades of polyvinyl alcohol with barrier properties that make them suitable for packaging oxygen sensitive goods and non-food products. VINEX 1003 is insoluble at 100° F., and may be more suitable for liquid packaging than other grades. However, since the VINEX resins are moisture sensitive, it is important that they be protected from moisture. Polymers such as LDPE are suitable for this purpose to ensure that the VINEX resin layer remains relatively dry during use. Meanwhile, the tie layer materials must be suitable for forming strong bonds between PVOH and the other polymers used in the laminate. A specialty grade of LDPE that will process at lower temperature is available from Eastman Chemical Corporation under the designation E6838-065P. Likewise, lower temperature tie layers are available from Quantum Chemical Company (PLEXAR 3342) and from Dupont (BYNEL E-406 or BYNEL E-409).

The package structures formed from the laminates of the present invention exhibit good barrier properties and may be produced using conventional equipment. The packages can be used for a variety of food and non-food packaging applications. Such packages make use of heat seals for forming and closing, and are utilized in the formation of folding boxes, rectangular containers and other shapes. A particular application is in the manufacture of gable top containers.

DETAILED DESCRIPTION

Figure 1:
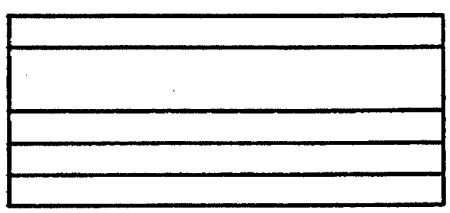
FIG. 1 is a cross-sectional elevation of a preferred embodiment of the laminate of the present invention.

Referring to FIG. 1, the preferred embodiment of the laminate of the present invention is shown as comprising a paperboard substrate having inner and outer surfaces. On the outer surface of the paperboard there is an outer layer of a heat seal polymer for example LDPE, having a coat weight on the order of abut 6–18 lbs/ream (ream size 3,000 sq. ft.). On the inner surface of the paperboard there is a layer of barrier material for example PVOH, having a coat weight on the order of about 4–6 lbs/ream, and an inner layer of a heat seal polymer having a coat weight on the order of about 6–18 lbs/ream. Depending upon how the laminate is made, there may also be a tie layer between the PVOH barrier layer and the inner heat seal layer. The tie layer would preferably have a coat weight of from about 4–6 lbs/ream.

Figure 5:
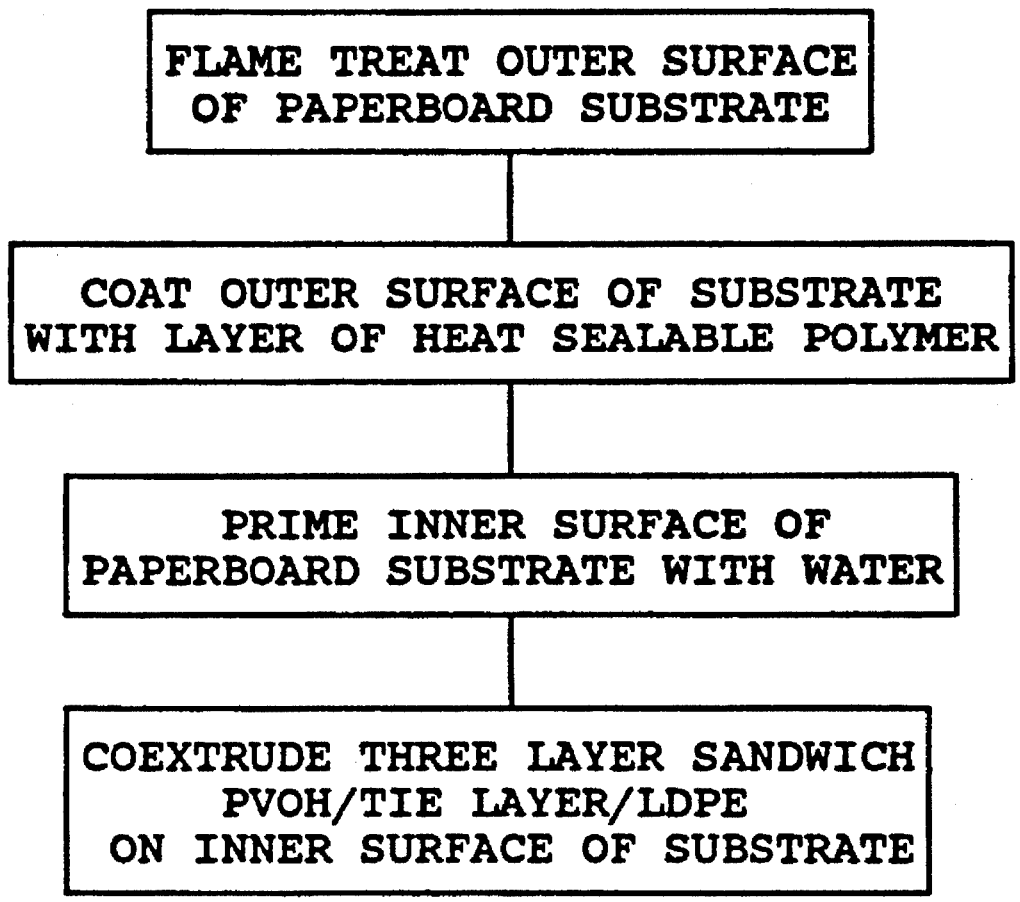
FIG. 5 is a block diagram showing typical steps used to make the laminate of FIG. 1.
Figure 6:
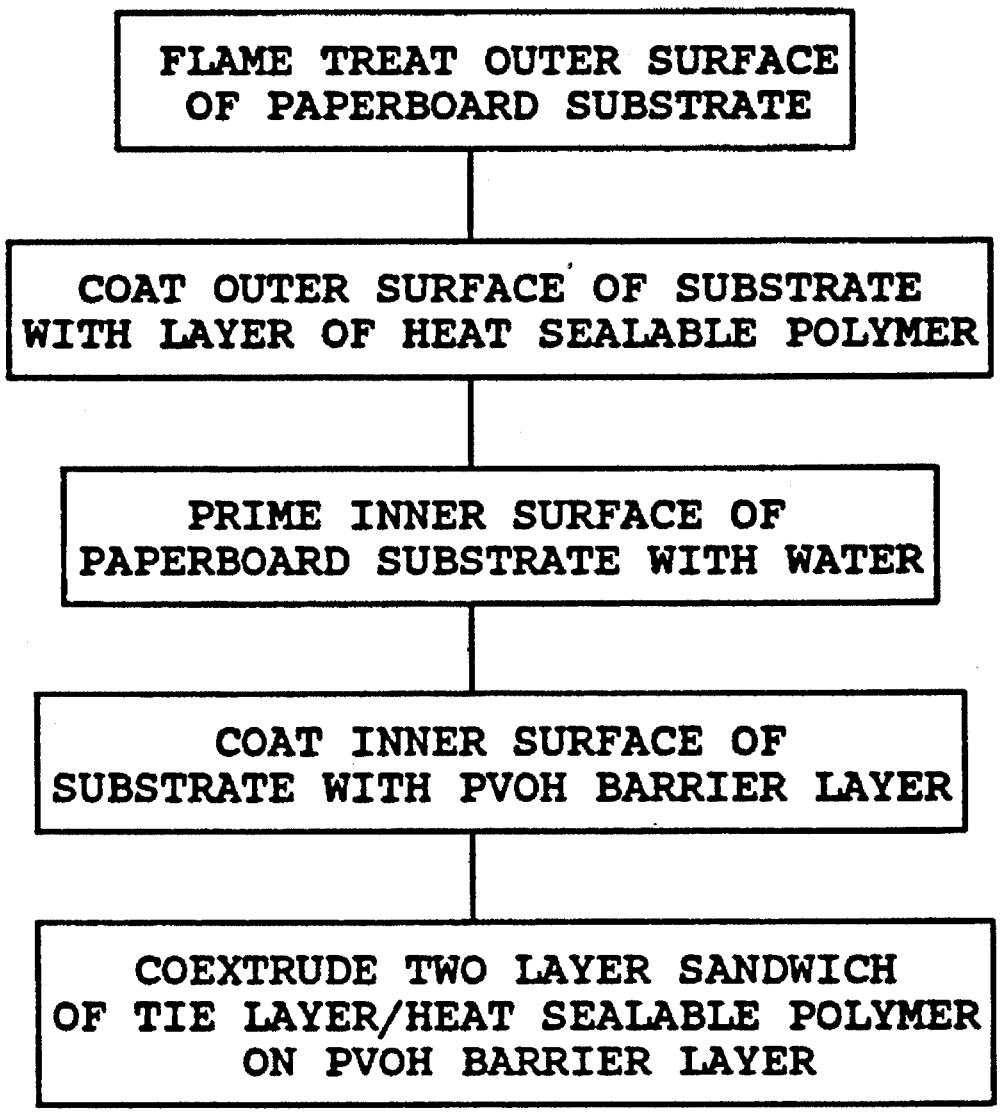
FIG. 6 is a block diagram showing an alternative method for making the laminate of FIG. 1.

The preferred method for manufacturing the laminate structure shown in Figure i is illustrated in FIG. 5, and involves flame treating and coating the outer surface of the paperboard substrate with an outer layer of heat seal polymer. The inner surface of the paperboard substrate is then primed with water before the coextrusion PVOH/tie/heat seal polymer is applied to the substrate. In an alternative method as shown in FIG. 6, the PVOH layer is applied to the treated paperboard surface followed by the application of the coextrusion tie/heat seal polymer to finish the inner surface of the substrate. With either method a laminate structure having good barrier properties is achieved. Containers prepared from the laminate material are heat sealable on conventional equipment at conventional temperatures.

Figure 2:
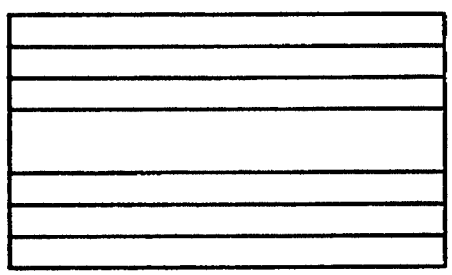
FIG. 2 is a cross-sectional elevation of a modification of the laminate structure shown in FIG. 1.

Referring to FIG. 2, there is illustrated a modification of the laminate structure shown in FIG. 1 wherein two PVOH layers are applied to a central core of paperboard. For this embodiment, the outside surface of the paperboard substrate is primed with water before a coextrusion of PVOH/tie/heat seal polymer is applied to the outer surface. The substrate is flipped over, and the inner surface of the paperboard substrate is primed with water before an inner coextruded sandwich of PVOH/tie/heat seal polymer is applied to the inner surface. Alternatively, coextrusions of PVOH/tie may be applied to each treated surface of the paperboard substrate before layers of heat seal coating are applied over the coextrusions, or PVOH layers may be applied to the treated paperboard surfaces followed by coextrusions of tie/heat seal coating. The result is a laminate as shown in FIG. 2 comprising from outside to inside, a heat seal layer, tie layer, PVOH barrier layer, paperboard substrate, PVOH barrier layer, tie layer and a heat seal layer. The advantages of this construction is the presence of two PVOH barrier layers and the ability to readily fold the laminate in either direction by applying score lines to either surface of the laminate.

Figure 3:
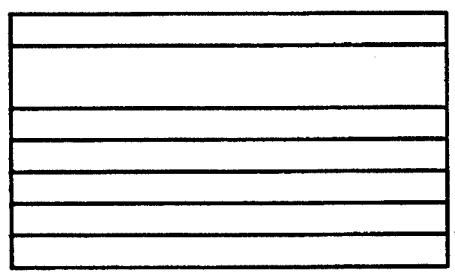
FIG. 3 is a cross-sectional elevation of an alternative embodiment of the laminate of the present invention.
Figure 7:
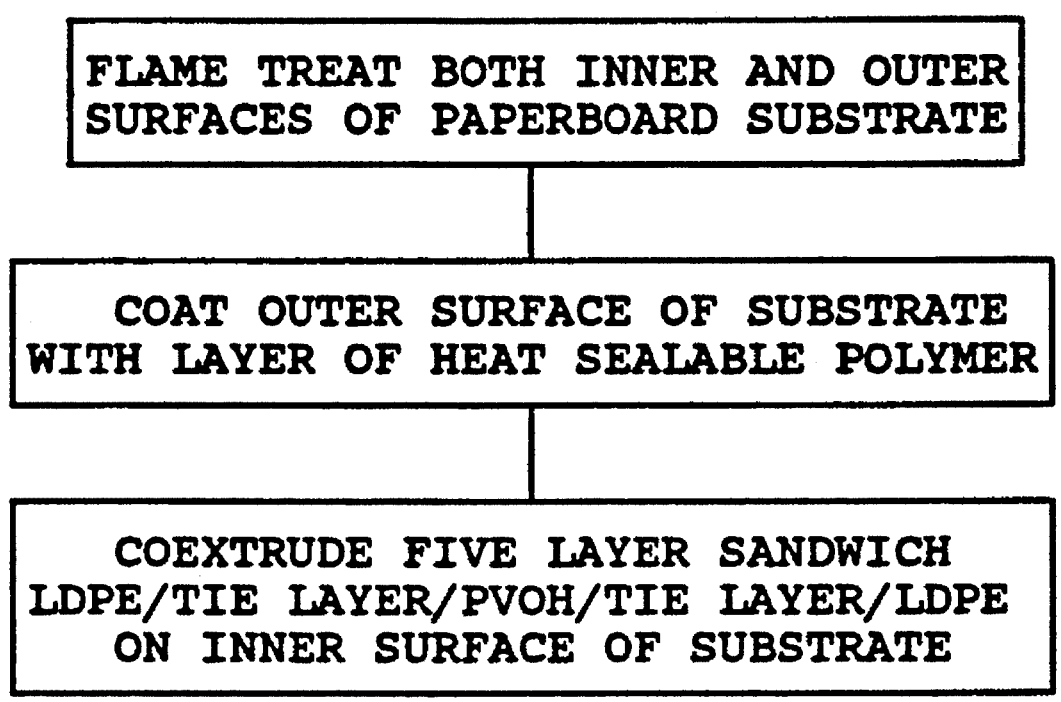
FIG. 7 is a block diagram showing typical steps for making the laminate of FIG. 3.

FIG. 3 illustrates an alternative construction according to the present invention wherein the PVOH barrier layer is buried in a symmetrical sandwich which is coextruded onto the paperboard substrate. For this purpose as shown in FIG. 7, the outer surface of the substrate is flame treated to promote adhesion, and an outer layer of a heat seal coating is applied thereto. The web is turned over so the inner surface of the substrate can be flame treated, and a coextrusion comprising a heat seal layer/tie layer/PVOH layer/tie layer/heat seal layer is coextruded onto the treated inner surface of the substrate. This construction provides a laminate that yields good barrier properties using well known manufacturing techniques. The heat sealability of this construction can be improved by applying an additional layer of heat sealable material to the exposed surface of the sandwich layer.

Figure 4:
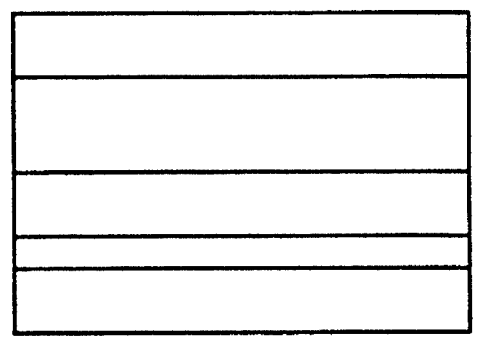
FIG. 4 is a cross-sectional elevation of yet another alternative embodiment of the laminate of the present invention.
Figure 8:
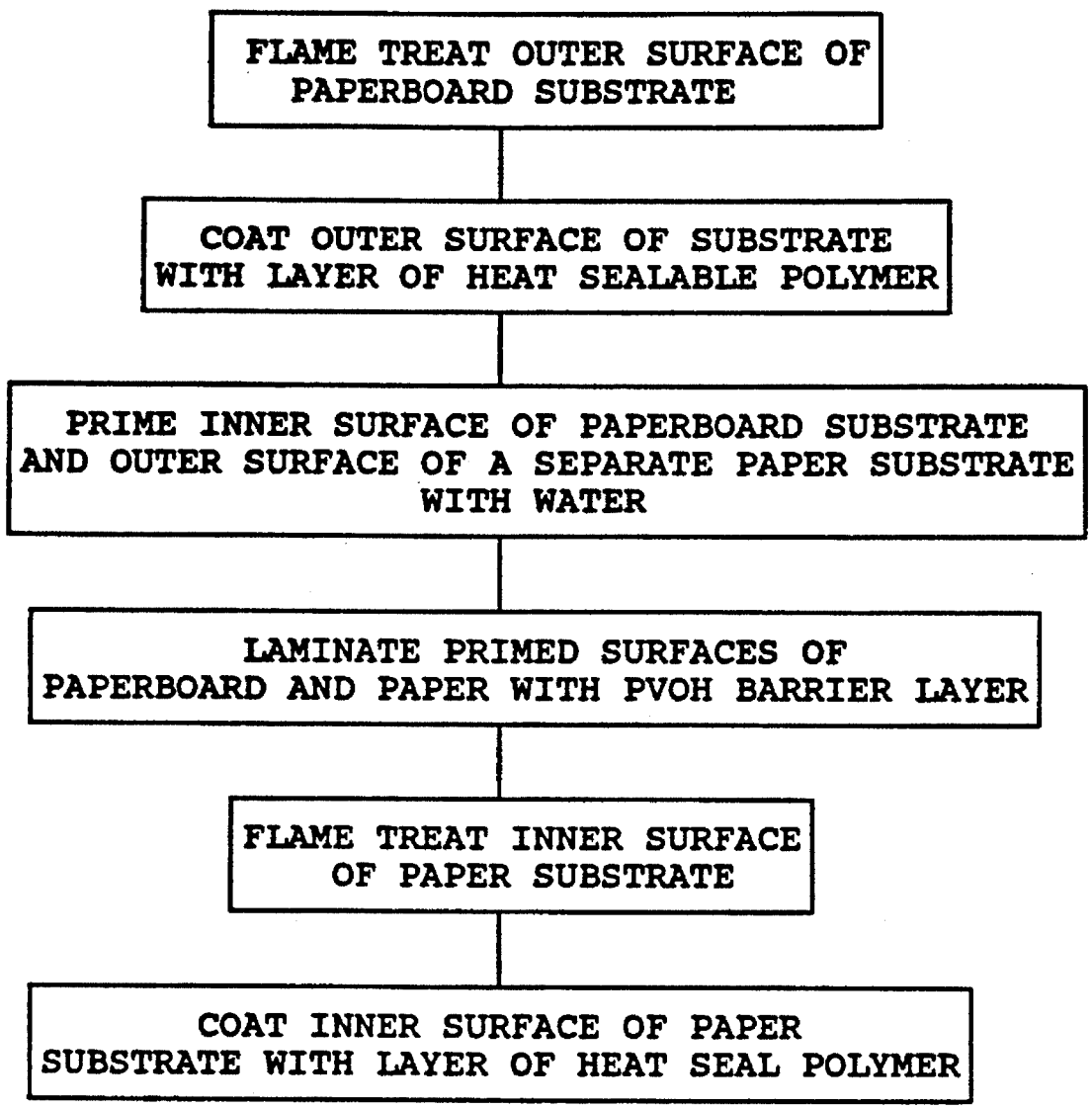
FIG. 8 is a block diagram showing typical steps for making the laminate of FIG. 4.
Figure 9:
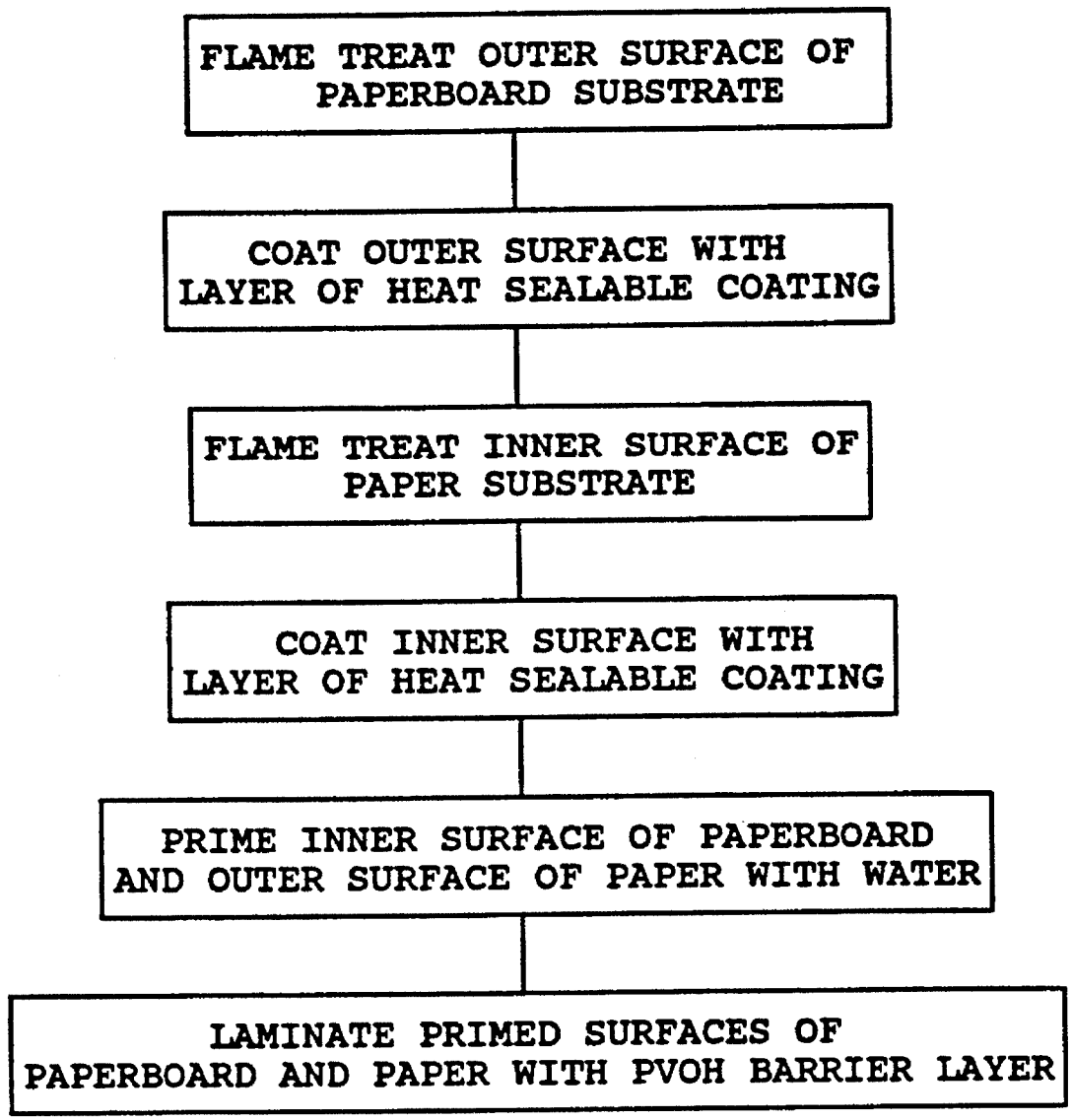
FIG. 9 is a block diagram showing an alternative method for making the laminate of FIG. 4.

The following embodiments of the present invention involve multiple substrate layers in the barrier laminate. FIG. 4 illustrates a laminate comprising from the outside to the inside, a heat seal layer/substrate/PVOH layer/substrate/ heat seal layer. In the preferred form of this embodiment, one substrate layer is a thick sheet of paperboard to provide stiffness, and the other substrate layer is a fairly thin sheet of paper with little or no structural strength. Alternatively, both substrate layers could be paperboard or paper. This structure is preferably manufactured as shown in FIG. 8 by starting with a paperboard substrate and a paper substrate each having heat seal coatings already applied to their outer surfaces. The PVOH layer in this case is used to laminate the two coated substrates together after the exposed surfaces of the paperboard and paper are primed with water. Alternatively the same laminate may be manufactured as shown in FIG. 9 by first coating the outer surface of the paperboard substrate with an outer heat seal layer before laminating the paper substrate to the coated board substrate with the PVOH layer. Finally, the exposed surface of the paper substrate is coated with an inner heat seal layer. In the latter process, the outer surfaces of the paperboard and paper substrates are preferably flame treated to enhance adhesion of the heat seal coating while the inner surfaces are primed with water to achieve good bonding with the PVOH barrier layer. The advantages of a structure according to FIG. 4 are the use of less total plastic material than with coextruded structures, no expensive tie layers and, of course, the absence of a coextrusion process.

The paperboard substrate in the FIG. 4 embodiment is preferably milk carton stock in the basis weight range of about 150–300 lbs/ream (ream size 3000 sq. ft.), preferably 260 lbs/ream for half gallon size gable top cartons. The PVOH layer is a VINEX polyvinyl alcohol copolymer resin having a coat weight of about 4–6 lbs/ream, and the paper layer is preferably a light weight, uncoated paper product having a basis weight on the order of about 40–100 lbs/ream (ream size 3300 sq. ft.). The heat seal layers are preferably LDPE with the outside layer having a thickness in the range of about 6–16 lbs/ream (ream size 3000 sq. ft.), preferably 12 lbs/ream, and the inside layer having a thickness of at least about 10 lbs/ream for good heat sealability.

Although specific coating techniques have been described for preparing the various laminate structures of the present invention, any appropriate technique for applying the layers onto the substrates disclosed may be employed, such as extrusion, coextrusion, extrusion lamination or adhesive lamination of single layer and/or multilayer films. Containers prepared from these structures provide good barrier properties against oxygen transmission and the loss of flavors and aromas, particularly under low humidity conditions, and good barrier properties against the penetration of moisture through the laminate.

What is claimed is:

1. A process for manufacturing a heat-sealable, PVOH barrier laminate useful for preparing containers for non-refrigerated liquid and dry products comprising the steps:

(a) flame treating a first surface of a paperboard substrate;

(b) extrusion coating a first layer of about 6–18 lbs/ream of a heat-sealable polymer onto the flame treated surface of the paperboard;

(c) priming a second surface of the paperboard substrate with water to wet the surface of the paperboard; and, (d) coextruding a product contact sandwich comprising a layer of 4–6 lbs/ream of a polyvinyl alcohol copolymer, an adhesive tie layer of 4–6 lbs/ream, and a second layer of about 10–14 lbs/ream of a heat sealable polymer in molten form onto the primed surface of said paperboard substrate such that the polyvinyl alcohol copolymer contacts the primed surface of the paperboard and the adhesive tie layer is between the polyvinyl alcohol layer and the second layer of heat-sealable polymer.

2. A process for manufacturing a heat-sealable, PVOH barrier laminate useful for preparing containers for non-refrigerated liquid and dry products comprising the steps:

(a) flame treating a first surface of a paperboard substrate;

(b) extrusion coating a first layer of about 6–18 lbs/ream of a heat-sealable polymer onto the flame treated surface of the paperboard substrate;

(c) priming a second surface of the paperboard substrate with water to wet the surface of the paperboard;

(d) extrusion coating onto the primed surface of the paperboard substrate a layer of 4–6 lbs/ream of a polyvinyl alcohol copolymer; and, (e) coextruding a product contact sandwich comprising an adhesive tie layer of 4–6 lbs/ream of a copolymer with functional groups and a second layer of about 10–14 lbs/ream of a heat-sealable polymer in molten form onto the polyvinyl alcohol copolymer layer such that the adhesive tie layer contacts the polyvinyl alcohol copolymer layer.

3. A process for manufacturing a heat-sealable, PVOH barrier laminate useful for preparing containers for non-refrigerated liquid and dry products comprising the steps:

(a) flame treating a first surface of a paperboard substrate;

(b) extrusion coating a first layer of about 6–18 lbs/ream of a heat-sealable polymer onto the first surface of the substrate;

(c) priming a second surface of the paperboard substrate of step (a), and a first surface of a separate paper substrate with water to wet the opposed surfaces of the paperboard and paper substrates;

(d) laminating the primed surfaces of the paperboard and paper substrates together with a layer of polyvinyl alcohol copolymer having a thickness of at least about 0.3 mil;

(e) flame treating a second, exposed surface of the paper substrate; and, (f) extrusion coating a second layer of about 10–14 lbs/ream of a heat sealable polymer onto the second, treated surface of the paper substrate.

4. A process for manufacturing a heat-sealable, PVOH barrier laminate useful for preparing containers for non-refrigerated liquid and dry products comprising the steps:

(a) flame treating a first surface of a paperboard substrate;

(b) extrusion coating a first layer of about 6–18 lbs/ream of a heat-sealable polymer onto the flame treated surface of the paperboard substrate;

(c) priming a second surface of the paperboard substrate with water to wet the surface of the paperboard;

(d) laminating a film of polyvinyl alcohol copolymer onto the primed surface of the paperboard substrate and flame treating the exposed surface of the polyvinyl alcohol copolymer film; and, (e) coextruding a product contact sandwich comprising an adhesive tie layer of 4–6 lbs/ream of a copolymer with functional groups and a second layer of about 10–14 lbs/ream of a heat-sealable polymer in molten form onto the polyvinyl alcohol copolymer layer such that the adhesive tie layer contacts the polyvinyl alcohol copolymer layer.

* * * * *